Feb. 13, 1945    E. W. BATTERSON ET AL    2,369,332
MOTION TAKE-UP FOR CONTROL CABLES
Filed July 9, 1943
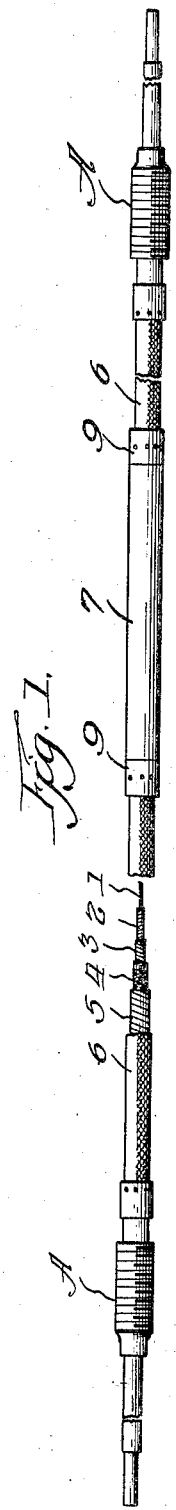
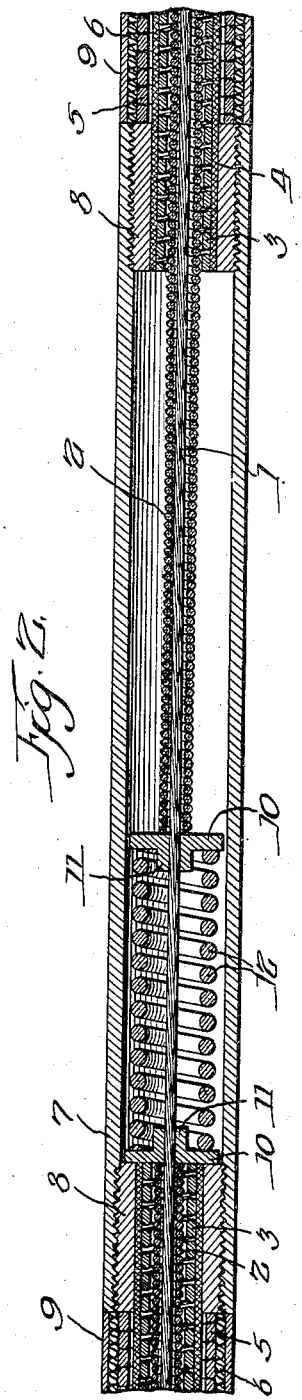
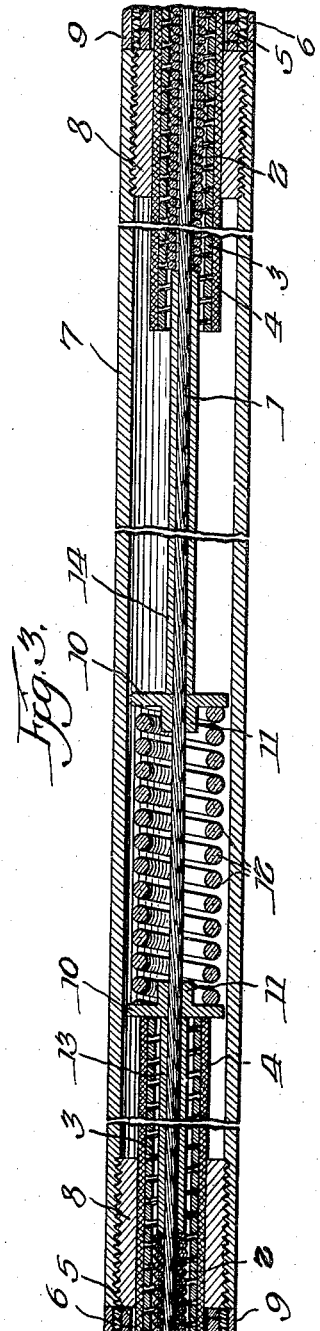
Inventors:
Ernest W. Batterson, &
Eugene A. Midling.
By W. F. Kellogg
Atty.

Patented Feb. 13, 1945

2,369,332

UNITED STATES PATENT OFFICE 2,369,332

MOTION TAKE-UP FOR CONTROL CABLES

Ernest W. Batterson and Eugene A. Midling, Kalamazoo, Mich., assignor to Shakespeare Products Company, Kalamazoo, Mich., a corporation of Michigan Application July 9, 1943, Serial No. 494,086

12 Claims. (Cl. 74—501)

This invention relates to improvements in flexible control cables and particularly, to that type of control described and claimed in our co-pending application for Letters Patent upon an improved heavy duty control cable, the invention having for an object to provide a novel form of motion take-up for the motion transmitting inner member of the control, which will allow for elongation of its coiled wire component upon bending or flexing of the control cable during its installation, and to some extent, in operation; thus, insuring adequate flexibility of the inner member and maintaining an invariable over-all length of the same for the efficient and accurate transmission of motion thereby.

It is also an object of the invention to provide a take-up for controls of the indicated character, wherein the flexible motion transmitting inner member thereof is supported in such a manner as will permit its being subjected to greater compression loads than said member would, otherwise, be capable of withstanding; hence, preventing control failure due to buckling of the inner member under an excessive pressure load applied thereto, and particularly, buckling at a point or points adjacent the take-up.

Other objects of the invention will be in part obvious and in part pointed out hereinafter.

In order that the invention and its mode of operation may be readily understood by those skilled in the art to which it appertains, we have in the accompanying drawing and the detailed description based thereupon, set out one embodiment of our invention.

In the drawing:

Figure 1 is a side elevation, with parts broken away, of a flexible control cable equipped with our improved motion take-up.

Figure 2 is a fragmentary longitudinal section through the equipped control cable and the improved motion take-up, and Figure 3 is a similar view, with parts broken away, of a modified form of motion take-up construction.

Having more particular reference to the drawing, in connection with which like characters of reference will designate corresponding parts throughout, our improved take-up is especially adaptable for use in connection with the type of flexible control cable illustrated and described in our above referred to co-pending application for Letters Patent; said cable, generally, comprising a motion transmitting inner member composed of a flexible cable 1 made of stranded twisted wires or the like; a tightly coiled wire or helical member 2 encasing the same substantially throughout ites length, and an outer member, to be presently described in some detail, which receives the inner member therein and therethrough. Said outer member comprises several principal components, to wit, a primary coiled wire or helical member 3, the coils or convolutions of which are relatively or substantially equi-spaced; a tightly braided non-elongating wire sheath 4 snugly and firmly encasing the primary member 3; a secondary and tightly coiled wire or helical member 5, which receives the encased primary member 3 therein, and a casing for the secondary member, preferably in the form of a tightly woven moisture and oil resisting fabric covering 6 entirely about said secondary member 5. The outer ends of the described control cable are suitably provided with combined connecting and operating fittings A, in order that the same may be effectually installed and the motion transmitting inner member 1, 2 operated to transmit motion. An inflexible tubular body 7, made of metal or other suitable material, of appropriate length, is interposed in the length of that portion of the cable constituted by the primary and secondary members 3 and 5, respectively, and their particular coverings 4 and 6. The diameter of this body 7 may be and preferably is slightly greater than that of the outside diameter of the control cable assembly, above described, for a purpose which will be presently apparent. Its opposite ends are internally screw threaded and receive screw threaded ferrules 8 therein, the outer ends of which are preferably flush with the adjacent or corresponding ends of the body.

As will be noted upon reference to Figure 2 of the accompanying drawing, connection between the adjacent portions of the primary and secondary members 3 and 5, and their respective coverings or sheaths, is effected, first, by extending portions of the primary member 3 and its braided wire sheath 4 into the ferrules 8 engaged in the opposite ends of the body 7, whereupon positive connection is made by soldering said ferrules to adjacent portions of the braided wire sheath 4; second, by engaging ferrules 9 about the adjacent end portions of the secondary member 5 and its covering 6, and arranging the same in flush abutting engagement with the particularly adjacent ends of the body 7 and its end received ferrules 8. The ferrules 9, preferably, correspond in diameter to the outside diameter of the body 7. In consequence, continuity of surface therebetween is provided.

Movably or slidably received within the inflexible tubular body 7, is a pair of washers 10.

having inwardly disposed and relatively opposed centrally positioned annular shoulders 11 thereon. Said washers, as will be noted upon reference to the accompanying drawing, have the flexible cable 1 engaged therethrough and through their respective annular shoulders 11. Moreover, it will be observed that such washers are interposed in the length of the coiled member 2 of the hereinbefore described motion transmitting inner member of the control and normally engage and bear upon the adjacent relative spaced ends thereof.

A pre-compressed coiled spring 12 is positioned between the relatively opposed and spaced washers 10, having its opposite ends engaged over the inwardly disposed annular shoulders 11 of said washers and bearing upon the latter. Obviously, the wire cable 1 is received or extended through this pre-compressed coiled spring 12. In consequence, it will be understood that the spaced and opposed washers 10 will be maintained in engagement with the particularly adjacent ends of the coiled wire member 2.

The spring 12, as will be understood, may be pre-compressed to the desired degree, in several ways, depending upon the design of parts. Such pre-compression may, however, be effected by fastening or securing the members 1 and 2 of the motion transmitting inner member, together at one end thereof, then compressing the wire member and the spring 12 while holding the loose end of the motion transmitting inner member until a predetermined load is obtained; thereupon, fastening the cable 1 and its wire member 2 (the inner member) at their remaining ends to render them an integral unit, including the now compressed coiled spring 12, the washers 10, which are free of the cable 1 for any small movement made necessary by any flexing of the control. It is desirable that the spring 12 be precompressed to a load or degree greater than any compressive load which may be applied to the inner member 1, 2 during its usage.

In usage of our improved motion take-up, and assuming that the same has been incorporated in a control cable in the manner hereinbefore described, it will be understood that during installation of the thus equipped control cable, it becomes necessary to bend or flex the same, throughout its length, about or around intermediately located or arranged objects, i. e., objects located between the control motion receiving end and the control motion transmitting end of the control cable. Such bending or flexing of the control cable results in elongation of the coiled wire member 2 of the motion transmitting inner member. Unless this elongation is compensated for, the motion transmitting efficiency of the control will be materially impaired. Because of the interpositioning of the precompressed coiled spring 12 in the length of the coiled wire member 2 of said inner member, it will be understood and appreciated by workers skilled in the art, that any material elongation of the wire member 2, effected as above, will be automatically compensated for. Moreover, if during actual operation of the improved control, further or additional flexing of the control cable is effected to such an extent as to cause further elongation of the coiled wire 2 of the inner member 1, this elongation, too, will be automatically compensated for.

Because of the slidable reception of the washers 10 within the tubular body 7, linear movement of the cable control inner member, for control adjustment or operation, will be permitted. Obviously, by increasing or decreasing the length of the tubular body 7, the extent of such adjustment or operation motion may be changed. Also, it will be understood that since the opposite or outer ends of the cable 1 and the wire member 2 of said inner member are interconnected, as hereinbefore explained, they will be collectively moved and the substantial limits of such movement will be reached when either one of said washers 10 abuttingly engages its corresponding or adjacent inner end of the ferrules 8 in the internally screw threaded opposite ends of the body 7.

In the form of take-up construction above described, it will be borne in mind that the inner member coiled wire 2 is in direct contact with the shouldered washers 10 at either extremity of the compressed spring 12. In such a construction, the control unit could not be subject to any greater compression load than the unsupported inner member 1, 2 is capable of withstanding. Therefore, with a view to elimination of control failure such as might be due to buckling of the inner member 1, 2 under an excessive compression load at points adjacent the improved take-up where it, otherwise, would be unsupported by an outer member of any form, we provide a somewhat modified embodiment of our invention, as shown in Figure 3 of the accompanying drawing.

In the form of invention disclosed in said Figure 3, lengths of solid or inflexible tubing 13 and 14 are substituted for corresponding portions or lengths of the wire member 2. The tubing is of a diameter such as to snugly receive or accommodate the cable 1 therein and therethrough. These lengths of tubing receiving the wire cable 1 are arranged at either end of the spring take-up assembly, constituted by the washers 10 and the pre-compressed coiled spring 12; the tubing 13, 14, being adapted to travel within the primary member 3 in the same manner as those portions of the coiled member 2 which it displaces, but which, as above indicated, is still provided at either of the outer ends of the tubing lengths 13 and 14. The described modified construction will give firm and solid support to those portions of the cable 1 within the same, and, as above explained, will eliminate buckling of the member 2 under an excessive compression load, at points adjacent the spring take-up, with resultant control failure.

Manifestly, the construction shown is capable of still further modification, and such modification as is within the scope of our claims, we consider within the spirit of our invention.

We claim:

1. In combination with a flexible control cable, including an outer member and a motion transmitting inner member including a cable and a coiled member encasing the same, received in and through the outer member; a tubular body intermediately of the outer member, and spring means interposed in the length of the coiled member, engaging and bearing on its adjacent ends bodily slidable within said body, and receiving said cable therethrough.

2. In combination with a flexible control cable, including an outer member and a motion transmitting inner member including a cable and a coiled member encasing the same, received in and through the outer member; a tubular body intermediately of the outer member, and spring means slidable in said body engaging and bearing upon spaced portions of said coiled member, and receiving said cable therethrough.

3. In combination with a flexible control cable, including an outer member and a motion transmitting inner member including a cable and a coiled member encasing the same, received in and through the outer member; a tubular body intermediately of the outer member, and expansible spring means bearing upon spaced portions of said coiled member slidably received in said body, and receiving said cable therethrough.

4. In combination with a flexible control cable, including an outer member and a motion transmitting inner member including a cable and a coiled member encasing the same, received in and through the outer member; a tubular body arranged in and intermediately of the outer member receiving said motion transmitting member therethrough, a portion of the coiled member of said motion transmitting member within the tubular body being removed, and spring means adjacent said removed portion of the coiled member engaging and bearing on the adjacent ends thereof bodily slidable in said body, and receiving said cable therethrough.

5. In combination with a flexible control cable, including an outer member and a motion transmitting inner member including a cable and a coiled member encasing the same, received in and through the outer member; a tubular body intermediately of the outer member, and spring means in and slidable throughout the length of said body interposed in an adjacent portion of said coiled member engaging and bearing on its adjacent ends, and receiving the cable therethrough.

6. In combination with a flexible control cable, including an outer member and a motion transmitting inner member including a cable and a coiled member encasing the same, received in and through the outer member; a tubular body intermediately of the outer member, and yieldable means reciprocally received in said body interposed in an adjacent portion of said coiled member engaging and bearing on its adjacent ends, and receiving the cable therethrough.

7. In combination with a flexible control cable, including an outer member and a motion transmitting inner member including a cable and a coiled member encasing the same, received in and through the outer member; an inflexible tubular body arranged in and intermediately of the outer member receiving said motion transmitting member therethrough, a portion of the coiled member within the body being removed, inflexible tubular means adjacent the removed portion of said coiled member receiving the cable of the motion transmitting means therethrough, and yieldable means in said body between corresponding ends of said tubular means.

8. In combination with a flexible control cable, including an outer member and a motion transmitting inner member including a cable and a coiled member encasing the same, received in and through the outer member; a substantially rigid tubular body arranged in and intermediately of the outer member receiving said motion transmitting means therethrough, a portion of the coiled member within the body being removed, substantially rigid tubular means adjacent the removed portion of said coiled member receiving portion of the motion transmitting member therethrough and having their inner ends relatively spaced, and motion compensating means in said body engaged between the spaced inner ends of said tubular means.

9. In combination with a flexible control cable, including an outer member and a motion transmitting member including a cable and a coiled member encasing the same, received in and through the outer member, a tubular member interposed in the outer member, and pre-tensioned spring means interposed within the length of the coiled member engaging and bearing on its adjacent ends and reciprocal within said tubular member.

10. In combination with a flexible control cable, including an outer member and a motion transmitting member including a cable and a coiled member encasing the same, received in and through the outer member, a tubular member interposed in the outer member, and compressed spring means interposed within the length of the coiled member engaging and bearing on its adjacent ends, and reciprocally mounted within said tubular member.

11. In combination with a flexible control cable, including an outer member and a motion transmitting member including a cable and a coiled member encasing the same, received in and through the outer member, a tubular member interposed in the outer member and compressed spring means interposed within the length of the coiled member engaging and bearing on its ends and mounted for limited reciprocal movement within said tubular member.

12. In combination with a flexible control cable, including an outer member and a motion transmitting member including a cable and a coiled member encasing the same, received in and through the outer member, a rigid tubular member interposed in the outer member, and precompressed spring means interposed within the length of the coiled member engaging and bearing on its adjacent ends and reciprocally mounted within said tubular member.

ERNEST W. BATTERSON.
EUGENE A. MIDLING.